United States Patent [19]

Temple

[11] B 4,013,627

[45] Mar. 22, 1977

[54] OIL AND WATER REPELLENT POLYMER CONTAINING ONIUM GROUPS

[75] Inventor: Stanley Temple, Wilmington, Del.

[73] Assignee: E. I. Du Pont de Nemours and Company, Wilmington, Del.

[22] Filed: Sept. 12, 1974

[21] Appl. No.: 505,221

[44] Published under the second Trial Voluntary Protest Program on March 30, 1976 as document No. B 505,221.

Related U.S. Application Data

[63] Continuation-in-part of Ser. No. 290,769, Sept. 20, 1972, abandoned.

[52] U.S. Cl. ............................. 526/245; 260/29.6 F; 260/29.6 TA; 428/500; 526/273; 526/304; 526/310; 526/326

[51] Int. Cl.² ................ C08F 226/02; C08L 27/12; C08L 39/00

[58] Field of Search ......... 260/29.6 F, 80.73, 2.1 E

[56] References Cited

UNITED STATES PATENTS

| | | | |
|---|---|---|---|
| 3,462,296 | 8/1969 | Raynolds et al. | 260/29.6 F |
| 3,491,169 | 1/1970 | Raynolds et al. | 260/29.6 F |
| 3,645,990 | 2/1972 | Raynolds et al. | 260/29.6 F |

*Primary Examiner*—Harold D. Anderson

[57] ABSTRACT

Oil and water repellent polymer comprised of polymer chain repeat units derived from (1) a monomer of the formula $R_fCH_2CH_2OCOC(R)=CH_2$ wherein $R_f$ is a perfluoroalkyl group of 4–14 carbon atoms and R is H or $CH_3$, (2) a vinyl monomer which is free of non-vinylic fluorine and (3) an ionic monomer of the formula $CH_2=C(R)-Z-Y^+X^-$ wherein R is H or $CH_3$, Z is a connecting group which activates vinyl polymerization, $Y^+$ is an onium ionic group and $X^-$ is a water solubilizing anion.

9 Claims, No Drawings

OIL AND WATER REPELLENT POLYMER CONTAINING ONIUM GROUPS

CROSS-REFERENCE TO RELATED APPLICATION

This is a continuation-in-part of application Ser. No. 290,769 filed Sept. 20, 1972, and now abandoned.

BACKGROUND OF THE INVENTION

1. Field of the Invention

This invention relates to improved oil and water repellent polymers.

2. Description of the Prior Art

The prior art discloses numerous polymers intended for application to textiles to bestow oil and water repellency and other desirable properties thereto. Such polymers generally contain pendent perfluoroalkyl groups of three or more carbon atoms, the perfluoroalkyl groups providing the desired repellencies. The perfluoroalkyl groups are attached by a wide variety of connecting groups to polymerized vinyl groups, the latter being polymer chain repeat units which form the principal or backbone polymer chains. Methods for producing such polymers, either in aqueous emulsion or solvent systems, are also well known in the art. A problem with the prior art systems is the providing of stable, easy-to-handle aqueous dispersions of such fluorine-containing polymers. A second problem is the obtaining of maximum efficiency of end-use of such fluorine-containing polymers, that is, limiting polymer deposition to the outer surfaces of textile fibers which are treated therewith, where the beneficial effects thereof are required.

SUMMARY OF THE INVENTION

It is an object of this invention to provide improved oil and water repellent polymers which form stable aqueous dispersions. A further object is to provide such dispersions which are useful in the treatment of textiles. Another object is to provide such aqueous dispersions which are stable in the presence of other textile treating agents. Still another object is to provide such aqueous dispersions which are stable in the presence of textiles which contain residues of textile treating agents which have been applied during prior textile treating processes.

In summary, the present invention resides in an oil and water repellent polymer comprising, by weight:

a. 20–99% of polymer chain repeat units derived from a monomer of the formula $R_fCH_2CH_2OCOC(R)=CH_2$ wherein $R_f$ is a perfluoroalkyl group of 4–14 carbon atoms and R is hydrogen or methyl;

b. 1–80% of polymer chain repeat units derived from a vinyl monomer which has no non-vinylic fluorine atom; and c. 0.1–4%, based on the combined weights of (a) and (b), of polymer chain repeat units derived from a monomer of the formula $CH_2=C(R)-Z-Y^+X^-$ wherein R is hydrogen or methyl, Z is a connecting group which activates vinyl polymerization, $Y^+$ is an onium ionic group and $X^-$ is a water solubilizing anion, the sum of (a) and (b) being 100%.

The above polymer definition is not intended to exclude from (a), (b) or (c) the presence of mixed repeat units which are derived from mixtures of monomers, all of which meet the monomer definition. Furthermore, it is not intended to exclude the presence of other polymer chain repeat units, that is, units which are derived from monomers which are outside the aforesaid monomer definitions. For example, a useful polymer within the above definition is one which, in addition to the aforesaid repeat units, contains up to 8%, based on the combined weights of (a) and (b), of polymer chain repeat units derived from one or more monomers selected from monomers of the formulas $CH_2=C(R)CONHCH_2OH$,

and $CH_2=C(R)COOCH_2CH(R)OH$, wherein R is hydrogen or methyl. Preferred polymers of this invention include those wherein R is methyl in the monomer defined in (a); wherein the vinyl monomer which has no non-vinylic fluorine atom is a 1–18 carbon atom alkyl ester of methacrylic acid; wherein the monomer defined in (c) is selected from monomers of the formulas $[CH_2=C(CH_3)COO(CH_2)_nY']^+X^-$ and $[CH_2=C(CH_3)COOCH_2CH(OH)CH_2Y'']^+X^-$ wherein $n$ is 2–6, $Y''$ is $[-NR^1R^2R^3]^+$ wherein each of $R^1$, $R^2$ and $R^3$ is an alkyl group of 1–4 carbon atoms, provided, however, that any two of $R^1$, $R^2$ and $R^3$ together can be alkylene of 4–5 carbon atoms or $-(CH_2)_2-O-(CH_2)_2-$ and $Y'$ is $Y''$ or the pyridinium group; and wherein there are present up to 8% of polymer chain repeat units which are derived from one or more of the three monomers defined immediately above.

DETAILED DESCRIPTION OF THE INVENTION

The polymers described in the Summary are prepared from the essential monomers defined in (a), (b) and (c) by known aqueous emulsion polymerization techniques. The aqueous polymer dispersions thereby produced have outstanding storage stability. They exhibit great efficiency in application to textiles and similar substrates. In addition, it has been found that dyed fabrics treated with these polymers exhibit improved crockfastness. The polymers also exhibit superior soil release properties on synthetic fibers, such as polyesters, polyamides and polyester/polyamide blends.

Monomers of the formula $R_fCH_2CH_2OCOC(R)=CH_2$ are well known in the art. They can be prepared by esterification of the appropriate alcohol $R_fCH_2CH_2OH$ with acrylic acid or methacrylic acid, for example, as described in U.S. Pat. No. 3,282,905. The methacrylate esters are preferred over the acrylate esters. The perfluoroalkyl group $R_f$ can be either straight or branched chain, with the former preferred. The monomers $R_fCH_2CH_2OCOC(R)=CH_2$ can contain a single perfluoroalkyl group, for example, perfluorooctyl, or a mixture of perfluoroalkyl groups. The alcohols $R_fCH_2CH_2OH$ are commercially available as a mixture containing 4–14 carbon atoms, predominantly six and eight carbon atoms, and monomers prepared from such alcohol mixtures are preferred. In the most preferred monomers of the above formula, R is methyl and $R_f$ is a mixture of perfluoroalkyl groups $CF_3CF_2(CF_2)_m-$ wherein $m$ is 4, 6, 8, 10 and 12 in the approximate weight ratio 35/30/18/8/3; such a monomer has a molecular weight of 522. The corresponding acrylate monomer has a molecular weight of 508.

The second essential monomer used in the preparation of the polymer of this invention is a vinyl monomer which has no non-vinylic fluorine atom. The term "has no non-vinylic fluorine" is used herein to indicate that the vinyl monomer can only possess fluorine atoms which are attached directly to a double-bonded carbon atom of the vinyl group. For this reason vinyl fluoride and vinylidene fluoride are included among the vinyl monomers listed below since, in these two monomers, all fluorine atoms are attached directly to double-bonded carbon atoms. "Vinyl", as the term is used herein, is intended to include monomers containing the vinyl group —CH=CH$_2$ and the vinylidene group —CR$^4$=CH$_2$ wherein R$^4$ is a substituent, such as lower alkyl, for example, methyl, or halogen. Both monovinyl compounds and conjugated dienes are contemplated for use herein. Non-conjugated dienes, wherein each vinyl group polymerizes independently, are not included since such monomers lead to undesirable cross-linking of polymer chains. For reasons which will be discussed below, the nature of the vinyl monomer chosen must be taken into consideration when determining the polymerization method used.

Polymerizable monovinyl compounds which are free of non-vinylic fluorine and which can be used herein include alkyl acrylates and methacrylates, the alkyl group containing 1–18 carbon atoms, vinyl esters of aliphatic acids, styrene, alkyl styrenes, vinyl halides, vinylidene halides, allyl esters and vinyl alkyl ketones. Representative of specific compounds which are useful herein are the methyl, propyl, butyl, isoamyl, 2-ethylhexyl, octyl, decyl, lauryl, cetyl, octadecyl acrylates and methacrylates, vinyl acetate, vinyl propionate, vinyl capyrylate, vinyl laurate, vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene and isoprene. The preferred vinyl monomers are the alkyl acrylates and methacrylates, and particularly, methyl, ethyl, butyl and 2-ethylhexyl methacrylates.

The third essential monomer used in the preparation of the polymer of this invention is an ionic monomer of the formula CH$_2$=C(R)—Z—Y$^+$X$^-$ wherein R is hydrogen or methyl, Z is a connecting group which activates vinyl polymerization, Y$^+$ is an onium ionic group and X$^-$ is a water solubilizing anion. Z can be any connecting group; typical examples include:

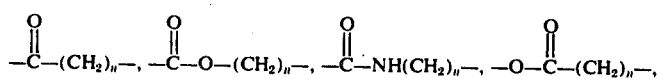

—O—(CH$_2$)$_n$— and —S—(CH$_2$)$_n$— wherein $n$ is an integer. In all cases involving the above examples, the carbonyl group, the ether oxygen atom or the sulfide sulfur atom of Z is attached directly to the vinyl group of the monomer. Z can also be a divalent aromatic radical, such as 1,4-phenylene, or a divalent aralkyl radical, such as

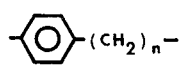

wherein $n$ is an integer. In such cases the aromatic radical is attached directly to the vinyl group of the monomer. Although all the above examples of connecting groups include an unsubstituted polymethylene moiety —(CH$_2$)$_n$—, it is to be understood that other moieties can be present. For example, polymethylene moieties containing non-reactive substituents, that is, substituents which do not participate in the polymerization reaction, such as hydrocarbon branches or hydroxy groups, can be present in the connecting groups.

The onium ionic group Y$^+$ can be any known type of onium ion which is not sensitive to pH changes; for example, it cannot be an acid salt of a tertiary amine group. Y$^+$ preferably is a quaternary ammonium ion [—NR$^1$R$^2$R$^3$]$^+$ wherein each R$^1$, R$^2$ and R$^3$ is a lower alkyl group of 1–4 carbon atoms. Other useful ammonium ions include those wherein any two of R$^1$, R$^2$ and R$^3$ together are an alkylene group of 4–5 carbon atoms or —(CH$_2$)$_2$—O—(CH$_2$)$_2$—. The former are ammonium salts based on N-alkylpyrrolidine

or N-alkylpiperidine

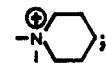

the latter are ammonium salts based on N-alkylmorpholine

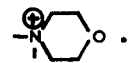

In some cases Y$^+$ can be the pyridinium ion

Two particularly preferred classes of ionic monomer are [CH$_2$=C(CH$_3$)COO(CH$_2$)$_n$Y']$^+$X$^-$ and [CH$_2$=C(CH$_3$)COOCH$_2$CH(OH)CH$_2$Y'']$^+$X$^-$. In the latter class Y'' is [—NR$^1$R$^2$R$^3$]$^+$, as defined above; in the first class Y' can be [—NR$^1$R$^2$R$^3$]$^+$, as defined above, or the pyridinium ionic group and $n$ can be 2–6.

A particularly preferred ionic monomer is

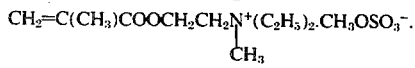

Another preferred monomer is

Many of the ionic monomers operable herein are known in the art. When Z in $CH_2=C(R)-Z-Y^+X^-$ is

the monomer can be prepared by reacting a vinyl haloalkyl ketone of the formula

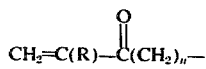

halogen with a tertiary amine or pyridine. When Z is

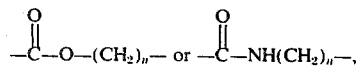

the monomer can be prepared by reacting a tertiary amino alcohol of the formula $HO(CH_2)_n-NR^1R^2$ or a diamine of the formula

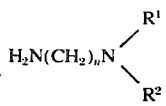

and acrylic or methacrylic acid, or a derivate thereof, and then reacting the resulting ester or amide with a di-(lower alkyl) sulfate or a lower alkyl halide to form the ammonium salt. When Z is

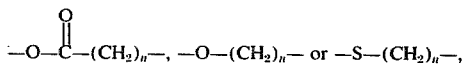

the monomer can be prepared by reacting the corresponding vinyl haloaliphatic acid ester, vinyl haloalkyl ether or vinyl haloalkyl sulfide and a tertiary amine or pyridine. The aforesaid particularly preferred monomer

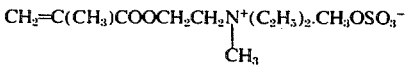

can be prepared by reacting commercially available $CH_2=C(CH_3)COOCH_2CH_2N(C_2H_5)_2$ with dimethyl sulfate. The aforesaid other preferred monomer

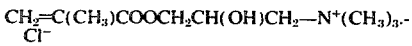

is a commercially available product.

The nature of the anion $X^-$ in the ionic monomer is, in general, determined by the method of synthesis of the onium salt. Usually, $X^-$ will be a halide ion, particularly chloride, bromide or iodide, or an alkyl sulfate ion alkyl $-O-SO_3-$. It is known, however, that quaternary ammonium salts can also be prepared by reaction of a tertiary amine and an alkyl ester of benzene or toluenesulfonic acid; in such event, $X^-$ will be a benzenesulfonate or a toluenesulfonate anion. The anion $X^-$ should be water solubilizing, as the aforementioned ions are. Any anion which tends to decrease water solubility should be avoided.

The polymers of this invention optionally, but preferably, contain up to 8%, based on the combined weights of (a) and (b) in the above invention definition, of polymer chain repeat units derived from one or more monomers of the formulas $CH_2=C(R)CONHCH_2OH$,

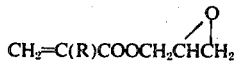

and $CH_2=C(R)COOCH_2CH(R)OH$ wherein R is hydrogen or methyl. Although any of these monomers can be used alone, it is often preferred to use monomer mixtures, particularly mixtures of the aforesaid first and third monomers. The preferred optional monomers are N-methylolacrylamide ($CH_2=CHCONHCH_2OH$), glycidyl methacrylate

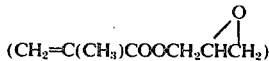

and 2-hydroxyethyl methacrylate ($CH_2=C(CH_3)COOCH_2CH_2OH$), all of which are commercially available. The preferred concentration of optional monomer is about 4%, based on the combined weights of monomers (a) and (b), with the most preferred polymers containing 2% each of N-methylolacrylamide and 2-hydroxyethyl methacrylate.

In general, the oil and water repellent polymer of this invention can be prepared by any of the many known techniques for emulsion polymerization of vinyl compounds. The process can be carried out in a reaction vessel fitted with a stirrer and external means for either heating or cooling the charge. The monomers to be polymerized together are emulsified in a water solution of a surface active agent to a given emulsion concentration of about 5–50%. Usually, the temperature is raised to 40°–70°C. to effect polymerization in the presence of an added catalyst. A suitable catalyst can be any of the commonly known agents for initiating the polymerization of an ethylenically unsaturated compound. These commonly known agents include 2,2'-azodiisobutyramidine dihydrochloride, 2,2'-azodiisobutyronitrile and 2,2'-azobis(2,4-dimethyl-4-methoxyvaleronitrile). The concentration of the catalyst for the polymerization usually is 0.1–2%, based on the weight of the monomers being polymerized. The surface active agent or agents employed to stabilize the emulsion during its makeup and during the polymerization can be a cationic or non-ionic emulsifying agent or agents. The cationic agents that can be employed include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride and N-[2-(diethylamino)ethyl]-oleamide hydrochloride. Non-ionic surface active agents that can be employed include condensation products of ethylene oxide and hexylphenol, isooctylphenol, hexadecanol, oleic acid, 12–16 carbon atom alkanethiols and 12–18 carbon atom alkyl amines. In addition, when molecular weight control is necessary as described below, small amounts of a suitable chain transfer agent, for example, an alkanethiol of 4–12 carbon atoms, can be present during the polymerization.

An important feature of the preparation of the polymers of this invention is that one of the types of monomers employed is ionic in nature and exhibits surfactant action. As a result, a lesser amount of added surfactant is needed during the polymerization than would otherwise be necessary. Based on the combined weights of monomers (a) and (b), about 1–4% of a suitable surfactant is ordinarily required. Preferred surfactants are quaternary salts of the formula $[R^5N(CH_3)_3]^+Z^-$ wherein $R^5$ is a long chain group of about 12–20 carbon atoms and $Z^-$ is a water solubilizing anion, generally a halide. The most preferred surfactant is dodecyltrimethylammonium chloride.

It has been found that the most useful polymers of this invention have viscosity average molecular weights in the range 10,000 – 100,000. Determination of viscosity average molecular weight is well known. It is described, for example, in "Textbook of Polymer Science," F. W. Billmeyer, Jr., Interscience Publishers, 1962, pages 79–85. Depending on the quality and nature of the monomers used (even trace amounts of impurities in some cases affect molecular weight), it may be necessary to add a chain transfer agent during polymerization. It has also been found desirable to control molecular weight carefully when an optional monomer $CH_2=C(R)CONHCH_2OH$,

or $CH_2=C(R)COOCH_2CH(R)OH$ is present. Such monomers are quite capable of causing crosslinking between polymer chains. To overcome the deficiencies caused by such crosslinking, it is preferred to decrease the molecular weight of the polymer chains accordingly. Thus, for optimum results, the amount of chain transfer agent added is directly proportional to the amount of optional monomer added. Since, for the reasons stated above, molecular weight can vary widely even with the same nominal monomer combinations, no simple rule can be formulated concerning the amount of chain transfer agent which should be added for any specific amount of optional monomer used. For optimum results, a certain amount of testing with the actual monomers, in the amounts to be used, is necessary.

It also has been found that certain precautions must be taken to ensure that the ionic monomer $CH_2=C(R)—Z—Y^+X^-$ is incorporated into the polymer during polymerization. The ionic monomers are water soluble, whereas the monomer $R_fCH_2CH_2OCOC(R)=CH_2$ is not, and it is possible for each monomer to polymerize separately in the same aqueous polymerization system. If the vinyl monomer free of non-vinylic fluorine has some water solubility, as is true, for example, for lower alkyl acrylates and methacrylates and vinyl esters of lower fatty acids, the vinyl monomer tends to facilitate incorporation of ionic monomer repeat units into the perfluoroalkylcontaining polymer. However, when the vinyl monomer is essentially water insoluble, as is true, for example, for higher alkyl acrylates and methacrylates and vinyl esters of long chain fatty acids containing 12 or more carbon atoms, then steps must be taken to facilitate incorporation of ionic monomer repeat units into the perfluoroalkyl-containing polymer. A convenient method for effecting such solution involves the addition of a water-soluble organic solvent, such as acetone, methanol or ethanol; such a method is disclosed in U.S. Pat. No. 3,062,765.

The polymers are obtained as aqueous dispersions. It is possible to isolate the polymer as a solid, if desired, for example, by filtration, centrifugation or evaporation of the liquid; for most purposes the aqueous dispersions can be used directly for application to a textile or substrate which is to be rendered oil and water repellent. The oil and water repellent polymers of this invention can be applied to the textile or substrate alone or they can be applied in admixture with diluent non-fluorinated polymers, such as disclosed in U.S. Pat. No. 3,378,609. Generally, such non-fluorinated polymers are prepared from the monomers described hereinabove as vinyl monomers which are free of non-vinylic fluorine atoms. When such non-fluorinated diluent polymers are used, they should contain polymer chain repeat units of the hereinabovedefined ionic monomer $CH_2=C(R)—Z—Y^+X^-$ in the weight ratio of 0.1–4 parts per 100 parts of the polymer chain repeat units of the other monomers, just as in the oil and water repellent polymers of this invention. The concentration of said diluent polymer can be as high as 80% by weight of the combined weights of oil and water repellent polymer and diluent polymer (400% by weight based on the weight of repellent polymer). The preferred concentration of diluent polymer is about 16⅔% of the combined polymer weights (20% by weight based on the weight of repellent polymer).

The polymers of this invention are generally applied to textile fabrics as aqueous dispersions by spraying, dipping, padding or other well-known methods. After excess liquid has been removed, for example, by squeeze rolls, the treated fabric is dried and then cured by heating, for example, at 135°–193°C., for at least 40 seconds, usually 60–180 seconds. The curing enhances oil repellency and durability. The polymers of this invention can be coapplied with other adjuvants, such as textile resins, water repellents and other additives which may be applied to the textiles. Such coapplied additives which detract from dry soil resistance, however, should be avoided when maximum soil resistance is desired. On the other hand, maximum water repellency and durability are obtained in the presence of textile resins, particularly those of the melamine-formaldehyde type. The polymers of this invention can be employed on textiles having a variety of uses. For example, they can be applied to automobile upholstery, particularly such upholstery having surfaces of nylon tricot, where dry soil resistance is of particular importance. Another important use of the polymers of this invention is on knit and woven polyester or polyester/cotton rainwear.

In preparing aqueous dispersion padbaths of the polymers of this invention for application to textiles, a surfactant, generally a non-ionic surfactant, usually is added as a bath stabilizer. Bath stabilizers are used especially when both anionic and cationic surfactants enter the bath along with other components since the stabilizers appear to ameliorate the undesired effects caused by the interaction of the two ionic types of surfactants. The stabilizer surfactant can be chosen from commonly available types, such as ethoxylated fatty acids, ethoxylated phenols, ethoxylated amides, ethoxylated amines, ethoxylated aliphatic alcohols and aliphatic amines. The preferred non-ionic surfactants are ethylene oxide adducts of 12–16 carbon atom alkyl alcohols, for example, $C_{13}H_{27}O(C_2H_4O)_8H$. These surfactants do not take the place of the usual emulsion polymerization surfactants but do aid in maintaining the dispersion. They are usually added during preparation of the padbath.

Salts, such as alkali metal sulfates and low molecular weight alkylamine hydrochlorides are optionally included in textile treating baths as adjuvants to aid deposition of polymeric agents or other agents on the fabric. Additionally, the use of chosen surfactants and salts may enhance the changes that occur on the textile during the drying and optional curing steps of the treatment. The objective is to obtain the optimum effect with the least amount of treating agent.

A typical padbath for application of the polymers of this invention is adjusted to provide 0.025–1.0%., preferably about 0.2%, of the polymer on the fabric, based on the weight of dry fabric. At 100% wet pickup by the fabric, the padbath concentration is 0.025–1.0%; correspondingly higher concentrations are required for lower pickups.

In commercial operations whereby chemical adjuvants are applied to textiles to alter their physical and/or chemical properties, for economic reasons it is desirable to effect such applications in as few steps as possible. Ideally, all the adjuvants are applied simultaneously. Examples of such adjuvants include permanent press or crease-proofing agents, oil and water repellents, dry soil resistors, hand improvers, and soil release agents, some or all of which may have such an effect on one another as to preclude simultaneous application of a mixture thereof employing a padbath technique. In addition, there are chemicals used in fiber processing and in weaving, spinning, knitting or scouring which enter the adjuvant application baths as residues on the fabric to further complicate the composition of the bath. Many aqueous dispersion products which by themselves function very satisfactorily in baths are found to coagulate or to be unsatisfactory in other ways when additional treating chemicals are present. The oil and water repellent polymers of the instant invention overcome these problems to a great degree. They exhibit a remarkable tolerance to a variety of chemicals in application baths by persisting in satisfactorily dispersed form during the textile application process. They are particularly tolerant of the presence in the aqueous baths of inorganic salts, such as tetrasodium pyrophosphate, having polyvalent anions and other chemicals which may be present as residues from spinning, weaving, knitting, dyeing or scouring processes.

The following examples are intended to be illustrative of the invention. Unless otherwise indicated, all parts are by weight.

EXAMPLE 1

Deionized water was refluxed with nitrogen gas bubbling through for about 1 hour, then cooled to 70°C. The treatment eliminated dissolved oxygen and carbon dioxide from the water. In a high shear mixer ("Osterizer") were placed 97.4 parts of the deionized water, 7.4 parts of dimethyldodecylamine, 3.7 parts of dimethylhexadecylamine, 9.0 parts of glacial acetic acid and 175.6 parts of the fluorinated monomer having the formula $C_2F_5(CF_2)_nC_2H_4O_2CC-(CH_3)=CH_2$ wherein $n$ is 4, 6, 8, 10 and 12 in the respective relative amounts 35:30:18:8:3, said monomer having an average molecular weight of 522. The mixture was agitated vigorously for 10 minutes, then an additional 58.8 parts of water were added and mixing was continued for an additional 1 minute. The resulting uniform emulsion was divided into 2 portions of 152.0 parts each. To portion A was added 0.8 part of $CH_2=C-(CH_3)CO_2CH_2CH(OH)CH_2N^+(CH_3)_3$ $Cl^-$ and to portion B, 0.4 part of the same material. Both portions were then purged with nitrogen for one hour, and to each portion were added 0.19 part of 2-hydroxyethyl methacrylate, 0.39 part of a 42% aqueous solution of N-methylolacrylamide and 0.24 part of tertiary dodecyl mercaptan. Each of portions A and B was added separately to 150 parts of deionized nitrogen-purged water in a reaction flask and each charge was heated to 65°C. To each charge were then added 4.2 parts of methyl acrylate and 0.2 part of azobis(isobutyramidine) dihydrochloride as a solution in 10 parts of water. The two charges were held at about 70°C. for 4 hours with moderate agitation. About 0.5 hour before the end of the 4 hour period, to each charge were added 10.7 parts of a 15% solution of dimethylhexadecylamine acetate. Each of the finished preparations contained about 23–23.5% solids. Both were uniform stable dispersions.

Stability of the polymer dispersions must ultimately meet the test of commercial use; however, stability can be tested by subjecting a sample to centrifugation in the laboratory and rating the amount of coagulum removed from the mass of the dispersion by the centrifugal action. The test used herein employed an International Clinical Centrifuge, Model CL 13403 H, spinning 10 ml. graduated test tubes at about 4,000 r.p.m. for 15 minutes. Accurate determination of solids content of the dispersion before and after centrifuging (by drying) indicates the proportion of solids remaining suspended in the dispersion. Preparations A and B above exhibited 99.9% and 99.7% stability, respectively, when so tested.

The polymer can be isolated by mixing the dispersion with 10 times its volume of acetone to precipitate the solid polymer which can then be isolated by filtration. The dispersion, however, can be handled conveniently as it is; it can be diluted with water to form a suitable padbath for textile application.

Samples from both A and B dispersions were applied to 100% polyester double knit fabric samples which were dried, cured and tested for oil and water repellency. The padbaths were prepared to contain 4% of the 23% dispersion (0.92% of the oil and water repellent), 2% of a 10% aqueous solution of an alkylamine hydrochloride accelerator and varying amounts of the surfactant $C_{13}H_{27}O(C_2H_4O)_8H$. The fabric samples were dipped and wrung to 60% wet pickup (thus containing 0.55% oil and water repellent), then dried horizontally at 121°C. and cured 3 minutes at 160°C. The treated fabric samples were tested for water repellency using AATCC Standard Test Method 22–1967 of the American Association of Textile Chemists and Colorists. A rating of 100 denotes no water penetration or surface adhesion; a rating of 90 denotes slight random sticking or wetting; lower values indicate greater wetting. Oil repellency was determined by modified Test Method 118-1966 of the AATCC. This test before modification comprises placing a drop of one of eight test solutions carefully on the textile on a flat horizontal surface. The nature of the test solutions is shown below. After thirty seconds any penetration or wicking into the fabric is noted visually. Treated textiles with a rating of five or greater are good or excellent; anything with a rating of one or over can be used for certain purposes. As an example, if a treated fabric repels the Nos. 1–6 solutions but not the number 7 solution, its rating is 6.

ethylene of a commercial drycleaning detergent (R. R. Street Co., No. 886 Detergent), extracting with tetrachloroethylene, drying for 3 minutes at 66°C. in a drum followed by pressing on each side of the fabric for 15 seconds at about 149°C.

Initial oil repellency should be at least 5 and initial water repellency, at least 80. After washing or drycleaning, repellencies are usually less, but values of 2 or above in oil repellency and 70 or above in water repellency represent significant improvement over untreated cloth. The results of the water and oil repellency tests are recorded in Table I.

TABLE I

| | Water and Oil Repellency | | | | | | |
|---|---|---|---|---|---|---|---|
| | | Dispersion A | | | Dispersion B | | |
| $C_{13}H_{27}O(C_2H_4O)_nH$, % on fiber wt. | | .012 | .024 | .048 | .012 | .024 | .048 |
| Water Repellency | Initially | 80 | 80 | 80 | 80 | 80 | 80 |
| | After drycleaning | 70 | 70 | 70 | 70 | 70 | 70 |
| | After 5 home washes | 80 | 70 | 70 | 80 | 80 | 70 |
| Oil Repellency | Initially | 5–6 | 5 | 4–5 | 5–6 | 5 | 4 |
| | After drycleaning | 0–1 | 0 | 0 | 1–2 | 2 | 1 |
| | After 5 home washes | 2 | 2 | 2 | 2 | 2 | 1–2 |

| Oil repellency rating | Test Solution | Surface tension, dynes/cm. at 25°C. |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65/35 hexadecane-"Nujol" | 29.6 |
| 1 | "Nujol" (purified petroleum oil) | 31.2 |

The AATCC oil repellency test was modified in this instance to increase its sensitivity. To each test solution there was added 0.2% by weight of the blue dye 1,4-bis(2,4,6-triethylanilino)anthraquinone. The presence of the dye aids the observer in seeing penetration or wicking of the oil into the fabric. In addition, the test solutions were allowed to remain on the fabric surface for 3 minutes rather than the usual 30 seconds before noting the penetration.

The treated fabric samples also were tested for washfastness by subjecting them to home washes. Home washes were carried out using a 4-lb. load with 29 grams of detergent ("Tide") in a standard washer ("Kenmore" Model 600). The washer was set at hot (12 minute cycle) with a warm rinse (12 minutes). The total washing and rinsing time was 40 minutes. In the tumble dry procedure used in these examples the spun dry fabrics were dried at about 71°C. in a home dryer with tumbling.

The treated fabric samples also were tested for fastness to drycleaning. The drycleaning test consisted of agitating the sample for 120 minutes in tetrachloroethylene containing 1.5 grams per 100 ml. of tetrachloro-

EXAMPLE 2

A second preparation was made following the procedure of Example 1 but using the following quantities of materials:

92.8 parts deionized water
7.08 parts dimethyldodecylamine
3.54 parts dimethylhexadecylamine
8.16 parts glacial acetic acid
167.2 parts fluorinated monomer of Example 1
56.0 parts additional water.

To the above emulsified mixture were added:
0.8 part $CH_2\text{=}C(CH_3)CO_2CH_2CHOHCH_2N^+(CH_3)_3\text{-}Cl^-$
0.38 part 2-hydroxyethyl methacrylate
0.78 part of 42% aqueous solution of N-methylolacrylamide
0.48 part of tertiary dodecyl mercaptan.

This emulsion was added to 300 parts of deionized nitrogenpurged water and heated to 65°C. There were then added:
8.4 parts of methyl acrylate
0.08 part of azobis(isobutyramidine) dihydrochloride (4 parts of a 2% aqueous solution)
21.4 parts of a 15% solution of dimethylhexadecylamine acetate.

The resultant dispersion containing 24% solids totaled 634.3 parts; it was 99.9% stable (lost only 0.1% solids on centrifuging). The dispersion was diluted with water to 6.58% solids and separated into 2 parts A and B. Part A was not changed. To Part B was added 0.572 part $C_{13}H_{27}O(C_2H_4O)_nH$ per 100 parts of dispersion. Samples A and B were applied to polyester double knit textile fabric and tested for oil and water repellency. The results of the tests are recorded in Table II.

TABLE II

| | | Dispersion A | | | Dispersion B | | |
|---|---|---|---|---|---|---|---|
| % on fiber wt. | | 2.5 | 2.0 | 1.5 | — | — | — |
| % on fiber wt. | | — | — | — | 2.5 | 2.0 | 1.5 |
| 2-hydroxy-1-propylamine hydrochloride (as a 10% aqueous solution) | | 2.0 | 2.0 | 1.5 | 2.0 | 2.0 | 1.5 |
| $C_{13}H_{27}O(C_2H_4O)_nH$ | | .02 | .02 | .02 | — | — | — |
| Water Repellency | Initially | 100 | 100 | 100 | 100 | 100 | 100 |

TABLE II-continued

|  |  | Dispersion A | | | Dispersion B | | |
|---|---|---|---|---|---|---|---|
|  | After Drycleaning | 80 | 80 | 80 | 80 | 80 | 80 |
|  | After 5 Home Washes | 80 | 80 | 80 | 80 | 80 | 80 |
| Oil Repellency | Initially | 6 | 6 | 6 | 6 | 6 | 6 |
|  | After Drycleaning | 5 | 6 | 5 | 5 | 5 | 5 |
|  | After 5 Home Washes | 5 | 5 | 5 | 5 | 5 | 5 |

Both A and B padbath dispersions were stable over a 24-hour period, during which time 9 strips of fabric were padded.

EXAMPLE 3

A suitable vessel was charged with 36.7 parts of water and a solution prepared from 5.13 parts of glacial acetic acid, 4.22 parts dimethyldodecylamine and 2.11 parts dimethyloctadecylamine. The charge was agitated at 40°–50°C. to completely dissolve the amine salts. Then 100.0 parts of the fluorinated monomer of Example 1 were added and the entire charge was homogenized in a high shear mixer at about 50°C. The equipment was rinsed with another 51.8 parts of water which was then added to the original charge. To a second vessel were added 200 parts of water which was refluxed for several hours with nitrogen bubbling through it to eliminate oxygen. The monomer mixture was also purged with nitrogen to eliminate oxygen. To the monomer mix were then added:

0.52 part 2-hydroxy-3-methacryloyloxypropyltrimethylammonium chloride
0.26 part 2-hydroxyethyl methacrylate
0.26 part N-methylolacrylamide(as a 60% aqueous solution)
0.286 part tertiary dodecyl mercaptan
5.21 parts methyl acrylate.

After a few minutes mixing, the monomer mixture was added to the nitrogen-purged water at 65°–70°C. and to it was added 0.135 part of 2,2'-azobis(isobutyramidine) dihydrochloride dissolved in 1.7 parts of water. The charge was polymerized at about 70°C. for 3.5 hours, then a mixture of 2.11 parts dimethylhexadecylamine, 1.4 parts glacial acetic acid and 9 parts of water was added and polymerization was continued for an additional 0.5 hour. The mass was then cooled to 30°–35°C. and the solids content was adjusted by adding water and mixing.

The product was tested for oil and water repellency and for dispersion stability in the treating bath. It was applied to polyester double knit rainwear fabric dyed in an aqua green shade from an aqueous treating bath containing 0.329% polymer solids, 0.029% $C_{13}H_{27}O(C_2H_4O)_8H$, and 0.23% 2-hydroxy-1-propylamine hydrochloride (as a 10% aqueous solution). The dipped fabric samples were wrung out to a wet pick up of 55%, then dried at 121°C. and cured 3 minutes at 160°C. Results of oil and water repellency tests are shown in Table III below.

TABLE III

|  | Oil Repellency | Water Repellency |
|---|---|---|
| Initial | 5 | 100 |
| After 5 Washes | 4 | 90 |
| After 10 Washes | 4 | 80 |
| After Drycleaning | 6 | 80 |

The treating bath exhibited satisfactory stability throughout a mill trial application lasting 2–3 hours. The treated cloth was equivalent to untreated cloth when tested for crocking (loss of dye on rubbing).

EXAMPLES 4–17

General Procedure for Emulsion Polymerization

I. Purge of Reaction Vessel

A quantity of water (A) was charged to an appropriate reaction vessel with an agitator, reflux condenser, thermometer, nitrogen inlet and addition funnel. The water was refluxed at atmospheric pressure for 30 minutes. While refluxing a slow stream of nitrogen was introduced into the reaction vessel. After the reflux purge the vessel was cooled to an inside temperature of 70°C., being careful to increase nitrogen flow so that air was not sucked back into the reaction vessel.

II. Preparation of Monomer Dispersion

Monomers which are relatively insoluble in water were dispersed to a fine particle size stable emulsion as follows. Water (B) and surfactant(s) (C) were charged to a suitable, commercially available, high speed agitator, for example, an "Osterizer" or Waring Blender, and the mixture was stirred mildly to dissolve the surfactant(s). A mixture of the relatively water-insoluble monomer $F(CF_2CF_2)_nCH_2CH_2OCOC(CH_3)=CH_2$ (D) of the composition

|  | Wt. % (approximate) |
|---|---|
| n = 6 | 35 |
| n = 8 | 32 |
| n = 10 | 18 |
| n = 12 and higher | 10 |
| nonpolymerizable components | 5 | and a methacrylate comonomer (E) was then added and the "Osterizer" was operated at its maximum speed for 10 minutes. During this period the temperature of the mixture rose from 30°–40°C. (initially) to 70°–80°C. due to the heat produced by mechanical agitation. For larger size polymerizations the monomer dispersion can be prepared by use of any other appropriate, commercially available dispersing apparatus, such as a colloid mill or a Manton-Gaulin Homogenizer. The resulting, stable monomer emulsion was mixed with an amount of water (F) to appropriately adjust its concentration. This diluted emulsion was charged to the addition funnel and sparged (under the liquid surface) with nitrogen for 30 minutes. After the purging and sparging of both reaction vessel and monomer emulsion was completed, the monomer emulsion was charged to the reacton vessel and the inside temperature was adjusted to 65°C. The following components were then added:

a relatively water-soluble hydrocarbon comonomer (G),
a polymerizable ionic comonomer (H),
a polymerizable comonomer (s) containing a reactive functionality in addition to the double bond (I), and
an appropriate chain transfer agent (J).

After these additions were completed, the temperature was held at 65°C. for 30 minutes. The initiator (K) was then added. After 5–15 minutes a temperature rise of 2°–7°C. was usually noted and the mixture was held at 70°C. for 4 hours (after the temperature rise) to complete the polymerization. The net weight (L) of the latex was determined and its non-volatile ("solids") content (M) was determined (1 gram of sample was dried for 4 hours at 110°C.). Data for Examples 4–17 are shown in Table IV. All parts are by weight except column M. In all the examples, the chain transfer agent -continued

| | |
|---|---|
| H-3 | Butyl methacrylate |
| I-1 | $[CH_2=C(CH_3)CO_2CH_2CH_2N(C_2H_5)_2]^+CH_3OSO_3^-$ |
| I-2 | $[CH_2=C(CH_3)CO_2CH_2CH_2\underset{CH_3}{\overset{CH_3}{N}}(C_2H_5)_2]^+ I^-$ |
| S-1 | Dodecyltrimethylammonium chloride (50% aqueous solution) |
| S-2 | $RO(C_2H_5O)_xH$ ($R=C_{12-16}$ alkyl, x is 15, average) |
| S-3 | Dimethyloctadecylamine |
| S-4 | Acetic acid |

TABLE IV

| Example No. | A Reactor Water | B Dispersion Water | C Surfactant | | D Fluoro Monomer | E Methacrylate Monomer | | F Water |
|---|---|---|---|---|---|---|---|---|
| 4 | 225.0 | 153.0 | S-1 | 15.0 | 187.5 | H-1 | 62.5 | 70 |
|  |  |  | S-2 | 4.2 |  |  |  |  |
| 5 | 28.2 | 12.6 | S-1 | 0.4 | 20.0 | — |  | 6.6 |
| 6 | 71.0 | 30.7 | S-1 | 1.5 | 37.5 | H-2 | 12.5 | 15.7 |
| 7 | 71.0 | 30.7 | S-1 | 1.5 | 37.5 | H-3 | 12.5 | 15.7 |
| 8 | 71.0 | 30.4 | S-1 | 1.5 | 47.5 | H-1 | 2.5 | 15.7 |
|  |  |  | S-2 | 0.2 |  |  |  |  |
| 9 | 71.0 | 30.4 | S-1 | 1.5 | 45.0 | H-1 | 5.0 | 15.7 |
|  |  |  | S-2 | 0.2 |  |  |  |  |
| 10 | 71.0 | 30.4 | S-1 | 1.5 | 41.2 | H-1 | 8.7 | 15.7 |
|  |  |  | S-2 | 0.2 |  |  |  |  |
| 11 | 225.0 | 153.0 | S-1 | 15.0 | 187.5 | H-1 | 62.5 | 70 |
|  |  |  | S-2 | 4.2 |  |  |  |  |
| 12 | 71.0 | 30.4 | S-1 | 1.5 | 33.5 | H-1 | 16.5 | 15.7 |
|  |  |  | S-2 | 0.2 |  |  |  |  |
| 13 | 71.0 | 30.4 | S-1 | 1.5 | 30.0 | H-1 | 20.0 | 15.7 |
|  |  |  | S-2 | 0.2 |  |  |  |  |
| 14 | 100.0 | 20.7 | S-3 | 1.0 | 32.5 | — |  | 16.7 |
|  |  |  | S-4 | 0.6 |  |  |  |  |
| 15 | 100.0 | 20.7 | S-3 | 1.0 | 32.5 | — |  | 16.7 |
|  |  |  | S-4 | 0.6 |  |  |  |  |
| 16 | 100.0 | 30.0 | S-3 | 2.0 | 50.0 | — |  | 16.4 |
|  |  |  | S-4 | 1.55 |  |  |  |  |
| 17 | 200.0 | 55.4 | S-3 | 2.0 | 100.0 | — |  | 33.0 |
|  |  |  | S-4 | 1.6 |  |  |  |  |

| Example No. | G Comonomer | | H Ionic Monomer | I Comonomer | | J Chain Transfer Agent | K Initiator | L Product | M Solids % |
|---|---|---|---|---|---|---|---|---|---|
| 4 | — |  | I-1 2.5 | D-1 | 5.0 | 1.25 | 0.18 | 736 | 33.0 |
|  |  |  |  | D-2 | 5.0 |  |  |  |  |
| 5 | C-1 | 1.0 | I-1 0.2 | D-1 | 0.4 | 0.1 | 0.014 |  | 29.0 |
|  |  |  |  | D-2 | 0.4 |  |  |  |  |
| 6 | — |  | I-1 0.5 | D-1 | 1.0 | 0.15 | 0.018 | 174 | 29.2 |
|  |  |  |  | D-2 | 1.0 |  |  |  |  |
| 7 | — |  | I-1 0.5 | D-1 | 1.0 | 0.15 | 0.018 | 176 | 28.74 |
|  |  |  |  | D-2 | 1.0 |  |  |  |  |
| 8 | — |  | I-1 0.4 | D-1 | 1.0 | 0.15 | 0.018 | 173 | 29.9 |
|  |  |  |  | D-2 | 1.0 |  |  |  |  |
| 9 | — |  | I-1 0.4 | D-1 | 1.0 | 0.15 | 0.018 | 172 | 29.7 |
|  |  |  |  | D-2 | 1.0 |  |  |  |  |
| 10 | — |  | I-1 0.4 | D-1 | 1.0 | 0.15 | 0.018 | 175 | 29.7 |
|  |  |  |  | D-2 | 1.0 |  |  |  |  |
| 11 | — |  | I-1 2.5 | D-1 | 5.0 | 1.25 | 0.18 | 736 | 33.0 |
|  |  |  |  | D-2 | 5.0 |  |  |  |  |
| 12 | — |  | I-1 0.4 | D-1 | 1.0 | 0.15 | 0.018 | 168 | 28.3 |
|  |  |  |  | D-2 | 1.0 |  |  |  |  |
| 13 | — |  | I-1 0.4 | D-1 | 1.0 | 0.15 | 0.018 | 171 | 28.3 |
|  |  |  |  | D-2 | 1.0 |  |  |  |  |
| 14 | C-2 | 11.7 | I-2 0.66 | — |  | 0.67 | 0.018 | 186 | 25.3 |
|  | C-1 | 5.8 |  |  |  |  |  |  |  |
| 15 | C-2 | 11.7 | I-2 0.66 | D-1 | 2.5 | 0.67 | 0.018 | 189 | 26.5 |
|  | C-1 | 5.8 |  |  |  |  |  |  |  |
| 16 | C-1 | 2.5 | I-1 0.525 | D-1 | 1.0 | 0.25 | 0.036 | 203 | 24.6 |
|  |  |  |  | D-2 | 1.0 |  |  |  |  |
| 17 | C-1 | 5.0 | I-1 1.05 | D-1 | 2.0 | 0.50 | 0.072 | 410 | 24.4 |
|  |  |  |  | D-2 | 2.0 |  |  |  |  |

(J) and the initiator (K) employed were dodecyl mercaptan and N,N'-azobisisobutyramidine dihydrochloride, respectively. The symbols employed in Table IV are as follows:

| | |
|---|---|
| C-1 | Methyl methacrylate |
| C-2 | Ethyl acrylate |
| D-1 | N-methylolacrylamide |
| D-2 | 2-Hydroxyethyl methacrylate |
| H-1 | 2-Ethylhexyl methacrylate |
| H-2 | Lauryl methacrylate |

Padbaths were prepared by blending an amount of the fluoropolymer (from Examples 4–17) and other optional components as shown in Table V. The fabric (polyester double knit) was padded to 100% wet pick up, then dried at 135°C. and cured at 171°C. Repellencies were determined, by the methods described above, initially, after 1 drycleaning (DC) and after 5 launderings (Wash), using the methods described. The data therefrom are shown in Table V. The symbols employed in Table V are as follows:

A-1 2-Hydroxypropylamine hydrochloride
A-2 Ethylene glycol
A-3 RO(CH$_2$CH$_2$O)$_x$—H (x = 7.5, average, R=R$_{12-16}$ alkyl)
A-4 RO(CH$_2$CH$_2$O)$_x$—H (x = 15, average, R=C$_{12-16}$ alkyl)
A-5 Polymer of 98 parts 2-ethylhexyl methacrylate and 2 parts N-methylolacrylamide
R-1 "Aerotex" 23 Special, a commercially available Melamine-"Uron" blend
R-2 "Aerotex" NW, a commercially available Melamine resin

TABLE V

| Polymer from Example No. | Bath Components (% by weight) | | |
|---|---|---|---|
| | Fluoropolymer % | Others Nature (a) | % |
| 4 | 0.18 | A-1 | 0.042 |
| | | A-2 | 0.052 |
| | | A-3 | 0.018 |
| | | R-1 | 0.1 |
| 5 | 0.18 | A-4 | 0.004 |
| | | A-5 | 0.035 |
| | | A-1 | 0.053 |
| | | R-2 | 0.2 |
| 6 | 0.13 | A-1 | 0.025 |
| | | R-2 | 0.1 |
| 7 | 0.13 | A-1 | 0.025 |
| | | R-2 | 0.1 |
| 8 | 0.18 | R-1 | 0.4 |
| | | A-1 | 0.13 |
| 9 | 0.19 | R-1 | 0.4 |
| | | A-1 | 0.13 |
| 10 | 0.20 | R-1 | 0.4 |
| | | A-1 | 0.13 |
| 11 | 0.22 | R-1 | 0.4 |
| | | A-1 | 0.13 |
| 12 | 0.25 | R-1 | 0.4 |
| | | A-1 | 0.13 |
| 13 | 0.26 | R-1 | 0.4 |
| | | A-1 | 0.13 |
| 14 | 0.36 | — | — |
| 15 | 0.36 | — | — |
| 16 | 0.25 | A-1 | 0.08 |
| | | R-2 | 0.3 |
| 16 | 0.25 | — | — |
| 17 | 0.165 | A-1 | 0.05 |
| | | R-2 | 0.2 |
| 17 | 0.163 | A-1 | 0.05 |
| | | R-2 | 0.2 |
| | | A-5 | 0.04 |

| Polymer from Example No. | Oil | | | Water | | |
|---|---|---|---|---|---|---|
| | Initial | 1 DC | 5 Wash | Initial | 1 DC | 5 Wash |
| 4 | 6 | 5 | 5 | 100 | 100 | 100 |
| 5 | 5 | 6 | 2 | 100 | 90 | 80 |
| 6 | 6 | 5 | 6 | 100 | 80 | 70 |
| 7 | 5 | 5 | 3–4 | 100 | 80 | 80 |
| 8 | 6 | 6 | 5 | 100 | 100 | 80 |
| 9 | 6 | 6 | 4 | 100 | 100 | 80 |
| 10 | 6 | 6 | 4–5 | 100 | 100 | 80 |
| 11 | 5 | 6 | 5 | 100 | 90 | 100 |
| 12 | 5 | 5–6 | 4 | 100 | 100 | 100 |
| 13 | 5 | 5 | 4 | 100 | 80 | 100 |
| 14 | 6 | 4 | 2 | 100 | 70 | 80 |
| 15 | 6 | 5 | 4 | 100 | 80 | 80 |
| 16 | 6 | 6 | 6 | 100 | 100 | 100 |
| 16 | 6 | 6 | 0 | 100 | 80 | 50 |
| 17 | 6 | 6 | 6 | 100 | 880 | 80 |
| 17 | 6 | 6 | 6 | 100 | 100 | 90 |

I claim:

1. Oil and water repellent solid polymer consisting essentially of, by weight:

a. 20–99% of polymer chain repeat units from a monomer of the formula R$_f$CH$_2$CH$_2$OCOC(R)=CH$_2$ wherein R$_f$ is a perfluoroalkyl group of 4–14 carbon atoms and R is hydrogen or methyl;

b. 1–80% of polymer chain repeat units from a vinyl monomer which has no non-vinylic fluorine atom; and c. 0.1–4%, based on the combined weights of (a) and (b), of polymer chain repeat units from a monomer of the formula CH$_2$=C(R)—Z—Y$^+$X$^-$ wherein R is hydrogen or methyl, Z is a connecting group which activates but does not take part in vinyl polymerization, Y$^+$ is an onium ionic group which is not sensitive to pH changes and X$^-$ is a water solubilizing anion, the sum of (a) and (b) being 100%.

2. The polymer of claim 1 wherein R$_f$ is C$_2$F$_5$(CF$_2$)$_n$- wherein $n$ is 4, 6, 8, 10 and 12 in the respective relative amounts of 35:30:13:8:3.

3. The polymer of claim 1 wherein there are present: (d) up to 8%, based on the combined weights of (a) and (b), of polymer chain repeat units from one or more monomers selected from monomers of the formulas $CH_2=C(R)CONHCH_2OH$, 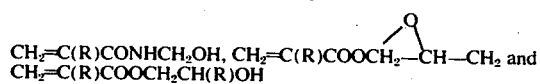 and
$CH_2=C(R)COOCH_2CH(R)OH$ wherein R is hydrogen or methyl.

4. The polymer of claim 1 wherein the polymer chain repeat units of (a) are from a monomer of said formula wherein R is methyl.

5. The polymer of claim 1 wherein the polymer chain repeat units of (b) are from an alkyl methacrylate, the alkyl group containing 1–18 carbon atoms.

6. The polymer of claim 1 wherein the polymer chain repeat units of (c) are from a monomer of the formula selected from $[CH_2=C(CH_3)COO(CH_2)_nY']^+X^-$ and $[CH_2=C(CH_3)COOCH_2CH(OH)CH_2Y'']^+X^-$ wherein $n$ is 2–6, $Y''$ is $[-N R^1 R^2 R^3]^+$ wherein each of $R^1$, $R^2$ and $R^3$ is a lower alkyl group of 1–4 carbon atoms or any two of $R^1$, $R^2$ and $R^3$ together are an alkylene group of 4–5 carbon atoms or $-(CH_2)_2-O-(CH_2)_2-$ and $Y'$ is $Y''$ or the pyridinium ionic group.

7. The polymer of claim 4 wherein R is $CH_3$ and the polymer chain repeat units of (b) are from methyl acrylate.

8. The polymer of claim 6 wherein the polymer chain repeat units of (c) are from $CH_2=C(CH_3)COOCH_2-CH(OH)CH_2N^+(CH_3)_3 \cdot Cl^-$.

9. The polymer of claim 6 wherein the monomer is of the formula

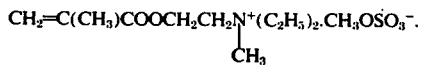

* * * * *

UNITED STATES PATENT OFFICE
CERTIFICATE OF CORRECTION

PATENT NO. : 4,013,627
DATED : March 22, 1977
INVENTOR(S) : Stanley Temple

It is certified that error appears in the above-identified patent and that said Letters Patent are hereby corrected as shown below:

Column 19, line 1 - "C(R)COOCH$_2$—CH(—O—)CH$_2$ should read --C(R)COOCH$_2$—CH(—O—)CH$_2$--.

Signed and Sealed this twelfth Day of July 1977

[SEAL]

Attest:

RUTH C. MASON
Attesting Officer

C. MARSHALL DANN
Commissioner of Patents and Trademarks